United States Patent [19]

Inui et al.

[11] 4,449,137

[45] May 15, 1984

[54] DRIVING METHOD FOR THERMAL RECORDING HEAD

[75] Inventors: Toshiharu Inui; Haruhiko Moriguchi; Takashi Ohmori, all of Kanagawa, Japan

[73] Assignee: Fuji Xerox Co., Ltd., Tokyo, Japan

[21] Appl. No.: 361,158

[22] Filed: Mar. 23, 1982

[30] Foreign Application Priority Data

Mar. 24, 1981 [JP] Japan .................................. 56-41715

[51] Int. Cl.$^3$ ........................................... G01D 15/10
[52] U.S. Cl. .................................. 346/76 PH; 219/216
[58] Field of Search ................... 400/120; 346/76, 1.1; 219/216 PH

[56] References Cited

U.S. PATENT DOCUMENTS

| 4,070,587 | 1/1978 | Hanakata | 400/120 X |
| 4,149,171 | 4/1979 | Sato et al. | 346/1.1 |
| 4,262,188 | 4/1981 | Beach | 219/216 PH |
| 4,360,819 | 11/1982 | Saito et al. | 346/76 PH |
| 4,376,942 | 3/1983 | Toth et al. | 219/216 PH |

FOREIGN PATENT DOCUMENTS

| 21351 | 2/1979 | Japan | 400/120 |
| 164177 | 12/1980 | Japan | 346/76 PH |

Primary Examiner—Donald Griffin
Attorney, Agent, or Firm—Sughrue, Mion, Zinn, Macpeak and Seas

[57] ABSTRACT

A thermal recording method which prevents recording density defects includes preheating the heating elements of the thermal recording head during a time when printing is not carried out. Particularly, the head may be preheated during times when a line is not printed, as between adjacent character lines of a printed or typed document, to prevent recording density deterioration of the next printed line.

6 Claims, 2 Drawing Figures

DRIVING METHOD FOR THERMAL RECORDING HEAD

BACKGROUND OF THE INVENTION

The present invention relates to a method of driving a thermal recording head which is effective to prevent recording density defects when employing a recorder using the thermal recording head.

A driving method for a recorder using a thermal recording head conventionally comprises heating a plurality of heating elements arranged on a substrate of the thermal recording head selectively according to picture information, thereby recording the picture information on thermally sensitive recording paper. In such a recorder, the time in which a heat pulse is impressed upon the thermal recording paper decreases as the recording speed is increased, and the quantity of heat supplied to a unit area by the heating element also tends to decrease. Therefore, the heating element is sometimes not thoroughly heated for the leading line of black information, when printing black information after white information has run successively in the sub-scanning direction on a high-speed recording unit, thus creating the problem that the printing density deteriorates at this portion.

SUMMARY OF THE INVENTION

In view of the above circumstances, the present invention provides a driving method for a thermal recording head which is capable of securing satisfactory recording density at the first line of printing even in the case where a picture signal for the antecedent line is constituted entirely by a non-recording signal.

The invention will attain the above-mentioned object by preheating the heating element up to a given temperature in a given time zone other than the time whereat a printing line is scanned.

DETAILED DESCRIPTION OF THE PREFERRED EMBODIMENTS

Figure 1:
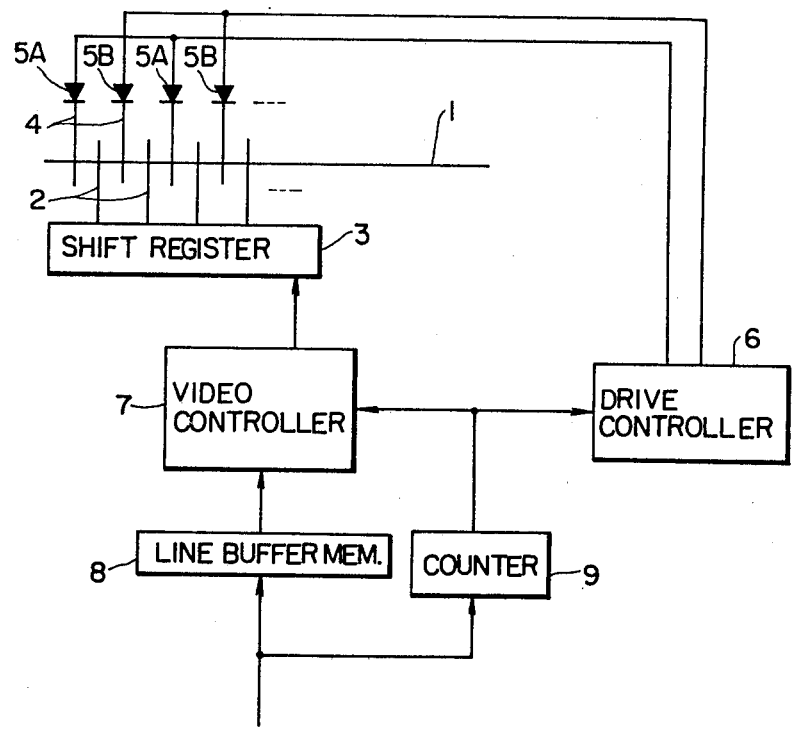
FIG. 1 is a printer circuit diagram for illustrating a method of driving a thermal recording head according to one preferred embodiment of the invention.
Figure 2:
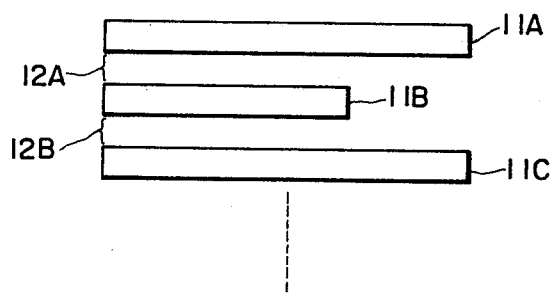
FIG. 2 is an explanatory drawing representing one example of an array of picture information on a printed or typed manuscript.

FIG. 1 represents a main part of a printer. The printer uses a thermal recording head with one slender heating unit 1 arranged on a substrate. A multitude of lead electrodes 2 are connected to the heating unit 1 at given intervals, other ends of the lead electrodes being connected to output terminals of a shift register 3 for series/parallel conversion. A multitude of lead electrodes 4 are also connected to the heating unit 1 at the given intervals and at positions so as not to overlap the lead electrodes 2. The odd-numbered lead electrodes are connected in common to one output terminal of a drive controller 6 through diodes 5A, while the even-numbered lead electrodes are connected in common to the other output terminal of the drive controller 6 through diodes 5B. A video controller 7 successively supplies picture signals corresponding to one line coming from a line buffer memory 8 to the shift register 3, and the electrodes 2 output a parallel signal. The controller 7 also has an output terminal to which the drive controller 6 responds to output a driving pulse to heat a corresponding heating element of the heating unit 1 according to the signals outputted through the lead electrodes 2, to thereby carry out thermal recording.

The printer is provided with a counter 9 for counting the number of black signals to be printed from among the picture signals transmitted from a computer or a transmitter, which counts the picture signals to be stored in the line buffer memory 8 for each line. In the case where the picture signal for one line is constituted by a non-recording signal like that of, for example, lines 12A, 12B, between character lines 11A, 11B, of a manuscript prepared on a typewriter, a signal to indicate preheating is sent to the video controller 7. Upon receipt of said signal, the video controller 7 inverts the picture signal of the corresponding line which is supplied from the line buffer memory 8 with an inverter, to supply the shift register 3, and then instructs the source drive controller 6 to output a preheating driving pulse. The source drive controller 6 then changes operation modes to output a driving pulse shortened from a normal width of 1 m sec., to a pulse width of 0.3 m sec. That is, in the case of a line in which the picture signal is constituted by a non-recording (e.g. white) signal, a signal corresponding to an all black picture signal is outputted from the shift register 3, and the source drive controller 6 outputs a shortened driving pulse. Therefore, all of the heating units are preheated, but only up to a temperature which will not cause printing to occur.

Since all the heating units are preheated, as described, during a non-recorded line, the heating elements will be thoroughly heated at the time when the first line to be printed is reached, and thus the recording density will not deteriorate. In the following lines to be printed, there arises no problem regarding the recording density, as the heating element will have been heated either partially or fully in the previous line.

According to the present invention, where there are one or more blank lines present prior to a line to be printed, the heating element of the thermal recording head will be preheated during the non-printed line immediately before the line to be printed, and therefore the printing quality can be improved, particularly in a high-speed recorder.

In the above embodiment, the heating element is preheated by shortening the driving time thereof, however, it goes without saying that the heating element may be preheated by a microscopic current so as to not cause recording on the recording paper by changing the driving voltage. Further, in the printer of the above embodiment, the configuration is such that preheating will occur at every non-printed line. However, in a configuration in which the number of blank lines (between printed lines) can be known beforehand, the heating element can be preheated, of course, several lines prior to the line to be printed. Furthermore, in a recorder receiving a signal indicating a line feed from a unit on the sending side, the heating element of the thermal recording head can be preheated while the line feed operation is performed, instead of using the counter described in the above embodiment. In a facsimile or copying machine in which a white line skipping operation is carried out, a similar effect will be obtainable without using the counter, by identifying the period of time in which such operation is carried out, and preheating the heating element during a part or all of said time.

The above embodiment was described with respect to the driving of a thermal recording head using a single heating unit, however, it goes without saying that the type of thermal recording head is not limited thereto.

What is claimed is:

1. In a method of driving a thermal recording head of a thermal recorder which is provided with a plurality of heating elements actuated selectively according to a picture signal, the improvement comprising; examining a picture signal of each line to discriminate whether it includes information to be printed, and preheating said heating elements by driving them up to a predetermined temperature only when said picture signal contains no information to be printed, said predetermined temperature being selected so as to be less than a thermal recording temperature.

2. A method as claimed in claim 1, wherein said preheating comprises directing a preheating driving pulse to said recording head to heat said heating elements.

3. A method as claimed in claim 2, wherein said pulse is of a duration substantially smaller than that used to record a picture signal.

4. A method as claimed in claim 1, wherein said preheating step comprises driving said heating elements with a current substantially smaller than that used to record a picture signal.

5. A method as claimed in claim 1, wherein said examining step includes counting black signals comprising signals to be printed, from among picture signals input for each line.

6. A method as claimed in claim 5, wherein, upon detecting no black signals, a picture signal according to said line is inverted, and applied to one input of the recording head, so as to enable all of said heating elements to be preheated.

* * * * *